United States Patent
Watazu et al.

(10) Patent No.: US 9,519,378 B2
(45) Date of Patent: Dec. 13, 2016

(54) PRESSURE DETECTOR AND TOUCH PANEL PROVIDED WITH PRESSURE DETECTOR

(71) Applicant: NISSHA PRINTING CO., LTD., Kyoto-shi, Kyoto (JP)

(72) Inventors: Yuji Watazu, Kyoto (JP); Keisuke Ozaki, Kyoto (JP); Eiji Kakutani, Kyoto (JP); Junichi Shibata, Kyoto (JP)

(73) Assignee: NISSHA PRINTING CO., LTD., Kyoto-Shi (JP)

(*) Notice: Subject to any disclaimer, the term of this patent is extended or adjusted under 35 U.S.C. 154(b) by 0 days.

(21) Appl. No.: 15/104,679

(22) PCT Filed: Mar. 12, 2014

(86) PCT No.: PCT/JP2014/056434
§ 371 (c)(1),
(2) Date: Jun. 15, 2016

(87) PCT Pub. No.: WO2015/093065
PCT Pub. Date: Jun. 25, 2015

(65) Prior Publication Data
US 2016/0320899 A1    Nov. 3, 2016

(30) Foreign Application Priority Data

Dec. 18, 2013   (JP) ................. 2013-261884

(51) Int. Cl.
*G06F 3/00* (2006.01)
*G06F 3/041* (2006.01)
(Continued)

(52) U.S. Cl.
CPC .............. *G06F 3/0416* (2013.01); *G01L 1/16* (2013.01); *G06F 3/044* (2013.01); *G06F 3/0414* (2013.01); *G06F 2203/04105* (2013.01)

(58) Field of Classification Search
CPC . G09G 2300/0404; G09G 5/003; G06F 3/041; G06F 3/0414; G06F 2203/04104; G06F 3/038; H01L 41/047; H01L 41/193; H01L 41/053
See application file for complete search history.

(56) References Cited

U.S. PATENT DOCUMENTS

2013/0027340 A1*  1/2013  Kodani ................... G06F 3/041
                                                      345/173

FOREIGN PATENT DOCUMENTS

| JP | 59-011841  | 1/1984 |
| JP | 2013-131110 | 7/2013 |
| WO | 2007/091600 | 8/2007 |

OTHER PUBLICATIONS

International Search Report, Date of mailing: Jun. 17, 2014 (Jun. 17, 2014).

* cited by examiner

*Primary Examiner* — Michael Faragalla
(74) *Attorney, Agent, or Firm* — Rankin, Hill & Clark LLP

(57) ABSTRACT

[Object] To provide a pressure detector capable of accurately detecting a pressing force.
[Solution] A pressure detector according to the present invention includes a first piezoelectric sheet 3a, a second piezoelectric sheet 3b located so as to be close to or in contact with the first piezoelectric sheet 3a, and a detection electrode 4 that sandwiches the first piezoelectric sheet 3a and the second piezoelectric sheet 3b. The first piezoelectric sheet 3a and the second piezoelectric sheet 3b are composed of materials having identical characteristics and have a thickness of 5 μm to 50 μm. Potential differences respectively generated between surfaces on a support substrate 1 side and surfaces opposite to the support substrate 1 of the
(Continued)

first piezoelectric sheet 3*a* and the second piezoelectric sheet 3*b* when the first piezoelectric sheet 3*a* and the second piezoelectric sheet 3*b* are pulled in an in-plane direction have a relationship expressed by expression 1: $V_1/V_2<0$. In expression 1, $V_1$ and $V_2$ represent potential differences respectively generated between the surfaces on the support substrate 1 side and the surfaces opposite to the support substrate 1 of the first piezoelectric sheet 3*a* and the second piezoelectric sheet 3*b*.

5 Claims, 6 Drawing Sheets

(51) Int. Cl.
*G01L 1/16* (2006.01)
*G06F 3/044* (2006.01)

PRESSURE DETECTOR AND TOUCH PANEL PROVIDED WITH PRESSURE DETECTOR

TECHNICAL FIELD

The present invention relates to a pressure detector capable of detecting a pressing force, and particularly relates to a pressure detector capable of accurately detecting a pressing force even if ambient temperature changes.

BACKGROUND ART

A piezoelectric sheet has a characteristic of converting a stress applied thereto into electric power, and devices exploiting this characteristic have been commercially produced in many fields.

A piezoelectric sheet has been applied to an electronic device such as a display device equipped with a touch panel. For example, PTL 1 describes a touch panel provided with a piezoelectric sheet that is adhered to a rear surface of the touch panel. When a press is applied to a front surface of the touch panel, the piezoelectric sheet generates a charge in accordance with the pressure. By detecting the charge, the touch panel is able to measure press information (the intensity of a pressing force).

CITATION LIST

Patent Literature

PTL 1: Japanese Unexamined Patent Application Publication No. 5-61592

SUMMARY OF INVENTION

Technical Problem

However, the invention described in PTL 1 involves the following problems.

1) If a temperature change occurs in the piezoelectric sheet, a charge is output from the piezoelectric sheet even if no press is applied, resulting in false pressure detection.

2) If a portion that is not subjected to tensile stress or compressive stress (a neutral axis of bending) is positioned near the piezoelectric sheet or in the piezoelectric sheet when a press is applied, the charge output sensitivity of the piezoelectric sheet to the press is very low. Particularly, if the neutral axis is positioned at the center of the piezoelectric sheet, no charge is generated on the front surface of the piezoelectric sheet even if a press is applied and the press cannot be detected.

3) Furthermore, when an adhesive is used to adhere together a support substrate and the piezoelectric sheet, if the adhesive layer is thick and soft or if the hardness of the adhesive changes in accordance with an environment such as temperature or humidity, the charge output sensitivity of the piezoelectric sheet to a pressing force changes significantly.

An object of the present invention is to provide a pressure detector capable of accurately detecting a pressing force if a temperature change occurs in a piezoelectric sheet, if a neutral axis of bending exists near the piezoelectric sheet or in the piezoelectric sheet when a press is applied to the pressure detector, and if an adhesive layer is thick and soft or if the hardness of an adhesive changes in accordance with an environment such as temperature or humidity when the adhesive is used to adhere together the piezoelectric sheet and a support substrate.

Solution to Problem

To achieve the above-described object, the present invention is configured as follows.

A characteristic configuration of a pressure detector of the present invention resides in a pressure detector that measures a press applied to a support substrate, including:

a first piezoelectric sheet located on a surface opposite to a surface applied with the press of the support substrate;

a second piezoelectric sheet located on a surface opposite to the support substrate of the first piezoelectric sheet so as to be close to or in contact with the first piezoelectric sheet; and a detection electrode that sandwiches the first piezoelectric sheet and the second piezoelectric sheet and that detects a potential difference between a surface on a support substrate side of the first piezoelectric sheet and a surface opposite to the support substrate of the second piezoelectric sheet when the press is applied, wherein the first piezoelectric sheet and the second piezoelectric sheet are composed of materials having identical characteristics and have a thickness of 5 μm to 50 μm, potential differences respectively generated between surfaces on the support substrate side and surfaces opposite to the th support substrate of the first piezoelectric sheet and the second piezoelectric sheet when the first piezoelectric sheet and the second piezoelectric sheet are pulled in an in-plane direction have a relationship expressed by expression 1: $V_1/V_2<0$, and in expression 1, $V_1$ represents $V_{1a}-V_{1b}$, $V_2$ represents $V_{2a}-V_{2b}$, $V_{1a}$ represents a potential at the surface on the support substrate side of the first piezoelectric sheet, $V_{1b}$ represents a potential at the surface opposite to the support substrate of the first piezoelectric sheet, $V_{2a}$ represents a potential at the surface on the support substrate side of the second piezoelectric sheet, and $V_{2b}$ represents a potential at the surface opposite to the support substrate of the second piezoelectric sheet.

According to another characteristic configuration of the pressure detector of the present invention, the first piezoelectric sheet and the second piezoelectric sheet may be in contact with each other, may be identical in terms of pressure distribution and temperature distribution, and may be composed of an identical material.

According to another characteristic configuration of the pressure detector of the present invention, the first piezoelectric sheet and the second piezoelectric sheet may be composed of a ferroelectric material, and polarization directions of the first piezoelectric sheet and the second piezoelectric sheet may be opposite to each other in a press-free state.

According to another characteristic configuration of the pressure detector of the present invention, the first piezoelectric sheet, the second piezoelectric sheet, and the detection electrode may have smaller flexural rigidity than the support substrate.

Another characteristic configuration of the present invention resides in a touch panel that measures a pressing force of a press applied to an input surface, including:

a plurality of upper electrodes located at intervals in one direction;

a plurality of lower electrodes that are located at intervals in a direction crossing the upper electrodes, on a side opposite to an input surface side of the upper electrodes, and that detect a press position between the upper electrodes and the lower electrodes;

a first piezoelectric sheet located on a surface opposite to the input surface of the lower electrodes;

a second piezoelectric sheet located on a surface opposite to the input surface side of the first piezoelectric sheet so as to be close to or in contact with the first piezoelectric sheet; and a detection electrode that sandwiches the first piezoelectric sheet and the second piezoelectric sheet and that detects a potential difference between a surface on the support substrate side of the first piezoelectric sheet and a surface opposite to the support substrate of the second piezoelectric sheet when the press is applied, wherein the first piezoelectric sheet and the second piezoelectric sheet are composed of materials having identical characteristics and have a thickness of 5 μm to 50 μm, potential differences respectively generated between surfaces on the input surface side and surfaces opposite to the input surface side of the first piezoelectric sheet and the second piezoelectric sheet when the first piezoelectric sheet and the second piezoelectric sheet are pulled in an in-plane direction have a relationship expressed by expression 2: $V_1/V_2<0$, and in expression 1, $V_1$ represents $V_{1a}-V_{1b}$, $V_2$ represents $V_{2a}-V_{2b}$, $V_{1a}$ represents a potential at the surface on the input surface side of the first piezoelectric sheet, $V_{1b}$ represents a potential at the surface opposite to the input surface side of the first piezoelectric sheet, $V_{2a}$ represents a potential at the surface on the input surface side of the second piezoelectric sheet, and $V_{2b}$ represents a potential at the surface opposite to the input surface side of the second piezoelectric sheet.

Another characteristic configuration of the present invention resides in a touch panel that measures a pressing force of a press applied to an input surface, including:

a plurality of upper electrodes located at intervals in one direction;

a plurality of lower electrodes that are located at intervals in a direction crossing the upper electrodes, on a side opposite to an input surface side of the upper electrodes, and that detect a press position between the upper electrodes and the lower electrodes;

a piezoelectric sheet including a first piezoelectric sheet located on a surface opposite to the input surface side of the lower electrodes and a second piezoelectric sheet located on a surface opposite to the input surface side of the first piezoelectric sheet so as to be close to or in contact with the first piezoelectric sheet;

first detection electrodes located in spaces between the lower electrodes in a cross-sectional view of the touch panel; and a second detection electrode that is located on a surface opposite to the input surface side of the second piezoelectric sheet and that detects a potential difference generated in the piezoelectric sheet in cooperation with the first detection electrodes when the press is applied, wherein the first piezoelectric sheet and the second piezoelectric sheet are composed of materials having identical characteristics and have a thickness of 5 μm to 50 μm, potential differences respectively generated between surfaces on the input surface side and surfaces opposite to the input surface of the first piezoelectric sheet and the second piezoelectric sheet when the first piezoelectric sheet and the second piezoelectric sheet are pulled in an in-plane direction have a relationship expressed by expression 3: $V_1/V_2<0$, and in expression 3, $V_1$ represents $V_{1a}-V_{1b}$, $V_2$ represents $V_{2a}-V_{2b}$, $V_{1a}$ represents a potential at the surface on the input surface side of the first piezoelectric sheet, $V_{1b}$ represents a potential at the surface opposite to the input surface side of the first piezoelectric sheet, $V_{2a}$ represents a potential at the surface on the input surface side of the second piezoelectric sheet, and $V_{2b}$ represents a potential at the surface opposite to the input surface side of the second piezoelectric sheet.

A touch panel that measures a pressing force of a press applied to an input surface, including:

a plurality of upper electrodes located at intervals in one direction;

a plurality of lower electrodes that are located at intervals in a direction crossing the upper electrodes, on a side opposite to an input surface side of the upper electrodes, and that detect a press position between the upper electrodes and the lower electrodes;

a piezoelectric sheet including a first piezoelectric sheet located on a surface opposite to the input surface side of the upper electrodes and a second piezoelectric sheet located on a surface opposite to the input surface side of the first piezoelectric sheet so as to be close to or in contact with the first piezoelectric sheet, the first piezoelectric sheet and the second piezoelectric sheet being located between the upper electrodes and the lower electrodes;

first detection electrodes located in spaces between the upper electrodes in a cross-sectional view of the touch panel; and second detection electrodes that are located in spaces between the lower electrodes in a cross-sectional view of the touch panel and that detect a potential difference generated in the piezoelectric sheet in cooperation with the first detection electrodes when the press is applied, wherein the first piezoelectric sheet and the second piezoelectric sheet are composed of materials having identical characteristics and have a thickness of 5 μm to 50 μm, potential differences respectively generated between surfaces on the input surface side and surfaces opposite to the input surface of the first piezoelectric sheet and the second piezoelectric sheet when the first piezoelectric sheet and the second piezoelectric sheet are pulled in an in-plane direction have a relationship expressed by expression 4: $V_1/V_2<0$, and in expression 4, $V_1$ represents $V_{1a}-V_{1b}$, $V_2$ represents $V_{2a}-V_{2b}$, $V_{1a}$ represents a potential at the surface on the input surface side of the first piezoelectric sheet, $V_{1b}$ represents a potential at the surface opposite to the input surface side of the first piezoelectric sheet, $V_{2a}$ represents a potential at the surface on the input surface side of the second piezoelectric sheet, and $V_{2b}$ represents a potential at the surface opposite to the input surface side of the second piezoelectric sheet.

Advantageous Effects of Invention

The pressure detector of the present invention, which has the above-described configuration, is capable of accurately detecting a pressing force if a temperature change occurs in a piezoelectric sheet or if a neutral axis of bending exists near the piezoelectric sheet or in the piezoelectric sheet when a press is applied to the pressure detector.

DESCRIPTION OF EMBODIMENTS

Hereinafter, embodiments of the present invention will be described in more detail on the basis of the drawings. Note that the dimensions, materials, shapes, relative positions, and so forth of portions or parts described in the embodiments of the present invention are merely examples and the scope of the invention is not limited thereto unless otherwise described.

In this description, a "thermal stress" means an internal stress of a piezoelectric sheet generated by the occurrence of a temperature change in a pressure detector or touch panel. Specifically, the thermal stress is a stress generated due to interference, by a support substrate or touch panel, with thermal expansion or thermal contraction of a piezoelectric sheet when the piezoelectric sheet is located on the support substrate or the like, a stress generated when the piezoelectric sheet has a temperature distribution in its plane, a stress generated due to unevenness inside the piezoelectric sheet, or the like.

In this description, a "pyroelectric effect" means a phenomenon in which a temperature change causes a charge to be generated at a front surface of a piezoelectric sheet.

In this description, a "neutral axis" means a place where no tensile stress or no compressive stress is applied to a pressure detector or touch panel even if a press (bending moment) is applied to the pressure detector or touch panel. If a "neutral axis" exists in a piezoelectric sheet, the charge detected when a press is applied to the pressure detector or touch panel is very small.

1. Electronic Device

1) Overall Structure of Electronic Device

A pressure detector according to the present invention will be described with reference to the drawings. A pressure detector 100 is provided in an electronic device 110, such as a mobile phone or portable game machine. In this embodiment, a description will be given of, as an example, the pressure detector 100 mounted in a multifunction mobile phone (smartphone), which is a kind of electronic device 110. In the following description, a side on which an input surface (an input surface 1a described below) of the pressure detector 100 is positioned is referred to as an "input surface side". The "input surface side" is a side that faces a user who operates the electronic device 110. In contrast, a back side viewed from the user who operates the electronic device 110 is referred to as a "rear surface side".

Figure 1:
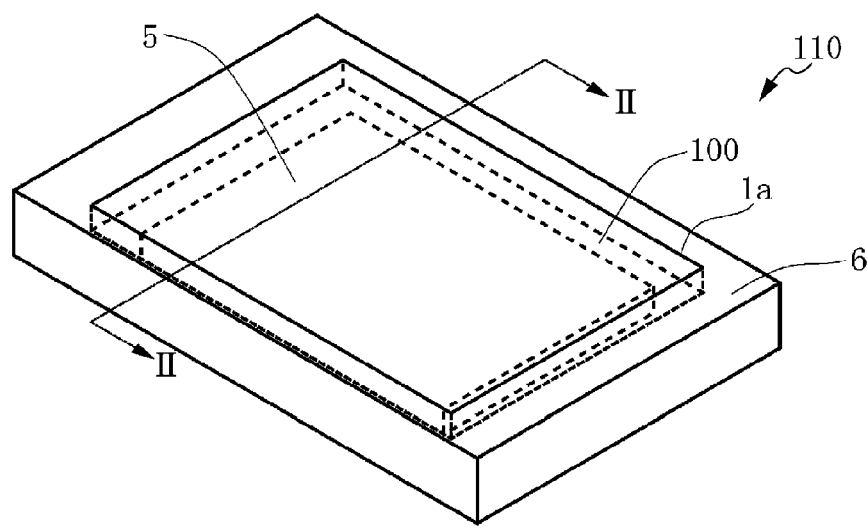
FIG. 1 is a perspective view of an electronic device.

As illustrated in FIG. 1, the electronic device 110 includes a casing 6 that is rectangular-frame-shaped, a display device 5 built in the casing 6, and the pressure detector 100 superimposed on the input surface side on the display device 5. The casing 6 is composed of a synthetic resin.

Figure 2:
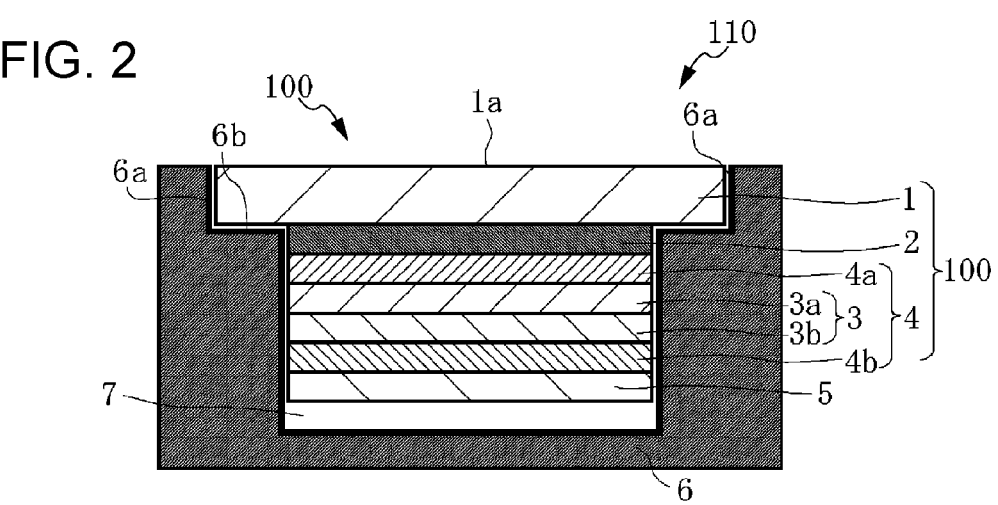
FIG. 2 is a cross-sectional view of a II-II cross section in FIG. 1.

As illustrated in FIG. 2, the casing 6 includes a recessed portion 6a (a bold-line portion) with a rectangular opening on the input surface side. The recessed portion 6a has a step portion. The step portion functions as a support portion 6b that supports the pressure detector 100. The support portion 6b is rectangular-frame-shaped corresponding to the shape of the recessed portion 6a. A support substrate 1, which will be described below, is accommodated in a region (a first accommodating recessed portion) on the input surface side relative to the support portion 6b (the step portion). The display device 5 and the pressure detector 100 are accommodated in a region (a second accommodating recessed portion) on the rear surface side.

The shape and dimensions of the recessed portion 6a can be appropriately set in accordance with the shapes and dimensions of the display device 5 and the pressure detector 100. In this embodiment, as an example, both the display device 5 and the pressure detector 100 are substantially rectangular-parallelepiped-shaped. In the recessed portion 6a, side surfaces of the first accommodating recessed portion are adjacent to the support substrate 1 with a small gap therebetween, and side surfaces of the second accommodating recessed portion are adjacent to the pressure detector 100 and the display device 5 with a small gap therebetween. A space portion 7, which is air, is provided between the casing 6 and the display device 5. With the space portion 7 being provided between the casing 6 and the display device 5, the pressure detector 100 bends when a user touches the input surface 1a by using his/her finger, a stylus, or the like, and potentials are generated at front surfaces of a first piezoelectric sheet 3a and a second piezoelectric sheet 3b. The generated potentials are detected by a first detection electrode 4a and a second detection electrode 4b, and thereby the intensity of a pressing force applied to the input surface 1a can be detected. The display device 5 is formed of an LCD or organic EL.

2. Pressure Detector

1) Overall Structure of Pressure Detector

As illustrated in FIG. 2, the pressure detector 100 is located in the recessed portion 6a of the casing 6 and includes a piezoelectric sheet 3 and a detection electrode 4. The pressure detector 100 may further include the support substrate 1 and an adhesive layer 2 that adheres the piezoelectric sheet 3 to the support substrate 1. In this embodiment, the pressure detector 100 includes the support substrate 1, the adhesive layer 2, the piezoelectric sheet 3, and the detection electrode 4. The support substrate 1, the adhesive layer 2, and the piezoelectric sheet 3 are located in this order from the input surface side toward the rear surface side. The piezoelectric sheet 3 bends when a press is applied thereto and generates a potential difference (charge) in the thickness direction of the piezoelectric sheet 3. The detection electrode 4 is located on the surfaces on the input surface side and the rear surface side of the piezoelectric sheet 3 so as to sandwich the piezoelectric sheet 3 and detects a potential difference (charge) generated in the piezoelectric sheet 3. Although not illustrated, the potential difference (charge) detected by the detection electrode 4 is processed by a detector connected to the detection electrode 4, and the amount of press applied to the pressure detector 100 is detected on the basis of the detected potential difference (charge). The amount of press applied to the pressure detector 100 can be detected in this manner.

1) Support Substrate

As illustrated in FIG. 2, the support substrate 1 is located in the support portion 6b of the casing 6 and forms the input surface 1a of the pressure detector 100. The support substrate 1 is thicker and harder than the piezoelectric sheet 3 and the detection electrode 4, which will be described below. Thus, the support substrate 1 has a greater flexural rigidity than the piezoelectric sheet 3 and the detection electrode 4. The flexural rigidity is the resistance to bending of a member applied with a press.

The support substrate 1 may be composed of, for example, general-purpose resins such as polyethylene terephthalate or acrylic resins, general-purpose engineering resins such as polyacetal resins or polycarbonate resins, super engineering resins such as polysulfone resins or polyphenylene sulfide resins, or glass. The support substrate 1 may have a thickness of, for example, 0.3 to 3 mm.

2) Adhesive Layer

For the adhesive layer 2, although not particularly limited, a transparent optical adhesive is preferably used. An example of such an adhesive is a pressure sensitive adhesive (PSA). The adhesive layer 2 may have a thickness of, for example, 5 μm to 300 μm.

3) Piezoelectric Sheet

The piezoelectric sheet 3 is a sheet that generates, when a press is applied and bending occurs, a potential difference corresponding to the press applied to the surfaces on the input surface side and the rear surface side of the sheet. The piezoelectric sheet 3 may be formed of a plurality of piezoelectric sheets. In this embodiment, the piezoelectric sheet 3 is formed of the first piezoelectric sheet 3a and the second piezoelectric sheet 3b. The first piezoelectric sheet 3a is located on the rear surface side of the support substrate 1. The second piezoelectric sheet 3b is located on the rear surface side of the first piezoelectric sheet 3a.

The first piezoelectric sheet 3a and the second piezoelectric sheet 3b generate charges at their surfaces on the input surface side and the rear surface side when being pulled in the in-plane direction and generate individual potential differences in the piezoelectric sheets. A potential difference ($V_1$) generated across the first piezoelectric sheet 3a and a potential difference ($V_2$) generated across the second piezoelectric sheet 3b are configured to satisfy the following relational expression 5.

$$V_1/V_2 < 0 \quad \text{Expression 5:}$$

In expression 5, $V_1$ represents $V_{1a} - V_{1b}$ and $V_2$ represents $V_{2a} - V_{2b}$. $V_{1a}$ represents a potential on the input surface side of the first piezoelectric sheet 3a when a tensile stress is generated in the first piezoelectric sheet 3a, and $V_{1b}$ represents a potential at the surface on the rear surface side of the first piezoelectric sheet 3a when a tensile stress is generated in the first piezoelectric sheet 3a. $V_{2a}$ represents a potential on the input surface side of the second piezoelectric sheet 3b when a tensile stress is generated in the second piezoelectric sheet 3b, and $V_{2b}$ represents a potential at the surface on the rear surface side of the second piezoelectric sheet 3b when a tensile stress is generated in the second piezoelectric sheet 3b.

Figure 3:
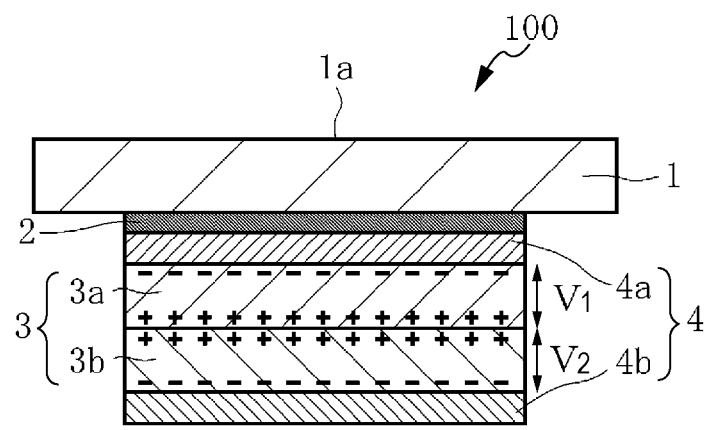
FIG. 3 is a cross-sectional view of a pressure detector.

As illustrated in FIG. 3, if the first piezoelectric sheet 3a and the second piezoelectric sheet 3b are configured to satisfy the above relational expression 5 and if the first piezoelectric sheet 3a and the second piezoelectric sheet 3b are subjected to a thermal stress, the same positive/negative charge is generated at the surface on the input surface side of the first piezoelectric sheet 3a and the surface on the rear surface side of the second piezoelectric sheet 3b (for example, if a positive charge is generated at the surface on the input surface side of the first piezoelectric sheet 3a, a positive charge is generated also at the surface on the rear surface side of the second piezoelectric sheet 3b, and, if a negative charge is generated at the surface on the input surface side of the first piezoelectric sheet 3a, a negative charge is generated also at the surface on the rear surface side of the second piezoelectric sheet 3b). In this embodiment, a negative charge is generated at the surface on the input surface side of the first piezoelectric sheet 3a and the surface on the rear surface side of the second piezoelectric sheet 3b.

Furthermore, the first piezoelectric sheet 3a and the second piezoelectric sheet 3b

1) have a sufficiently small thickness (for example, 5 μm to 50 μm),
2) are close to each other (for example, close to each other with a distance of 1 μm to 50 μm therebetween) or in contact with each other, and
3) are composed of materials having identical characteristics.

The "materials having identical characteristics" means materials that are approximate in terms of pyroelectric constant, piezoelectric constant, Young's modulus, and permittivity.

With the above-described configuration, if the piezoelectric sheet 3 is subjected to a thermal stress, the potential difference ($V_1$) generated across the first piezoelectric sheet 3a and the potential difference ($V_2$) generated across the second piezoelectric sheet 3b satisfy the following relational expression 6.

$$|V_1| \approx |V_2| \quad \text{Expression 6:}$$

Furthermore, with the above-described configuration, the following relational expression 7 is satisfied between the surface on the rear surface side of the first piezoelectric sheet 3a and the surface on the input surface side of the second piezoelectric sheet 3b.

$$V_{1b} \approx V_{2a} \quad \text{Expression 7:}$$

Thus, relational expression 8 is derived from relational expressions 5 to 7.

$$V_{1a} \approx V_{2b} \quad \text{Expression 8:}$$

Thus, with the above-described configuration, if the piezoelectric sheet 3 is subjected to a thermal stress, the potential at the surface on the input surface side of the first piezoelectric sheet 3a and the potential at the surface on the rear surface side of the second piezoelectric sheet 3b generated from the thermal stress are substantially equal to each other.

As illustrated in FIG. 3, in the pressure detector 100, the detection electrode 4 is located on the surface on the input surface side of the first piezoelectric sheet 3a and the surface on the rear surface side of the second piezoelectric sheet 3b. The detection electrode 4 detects a difference between a potential generated at the surface on the input surface side of the first piezoelectric sheet 3a and a potential generated at the surface on the rear surface side of the second piezoelectric sheet 3b as a potential difference generated in the piezoelectric sheet 3. Thus, the potential difference in the piezoelectric sheet 3 detected by the detection electrode 4 when the first piezoelectric sheet 3a and the second piezoelectric sheet 3b are subjected to a thermal stress is calculated as $V_{1a} - V_{2b} \approx 0$ from expression 8 and is detected as substantially "0". Thus, with the above-described configuration of the piezoelectric sheet 3 and the detection electrode 4, a potential difference derived from a thermal stress in the entire piezoelectric sheet 3 is hardly detected even if thermal stress acts on the first piezoelectric sheet 3a and the second piezoelectric sheet 3b. Therefore, a malfunction resulting from a thermal stress generated in accordance with a temperature change hardly occurs in the pressure detector 100.

Description has been given that the first piezoelectric sheet 3a and the second piezoelectric sheet 3b 1) have a sufficiently small thickness, 2) are close to each other or in contact with each other, and 3) are composed of materials having identical characteristics.

In addition, preferably, the first piezoelectric sheet 3a and the second piezoelectric sheet 3b 4) are in contact with each other,
5) are identical in terms of pressure distribution and temperature distribution, and
6) are composed of an identical material.

If the first piezoelectric sheet 3a and the second piezoelectric sheet 3b have such a configuration, the above expressions 6 and 7 are rewritten as follows.

$$|V1|=|V2| \qquad \text{Expression 6':}$$

$$V1b=V2a \qquad \text{Expression 7':}$$

Thus, relational expression 8' is derived from relational expressions 5, 6', and 7'.

$$V1a=V2b \qquad \text{Expression 8':}$$

That is, with the above-described configuration, even if a thermal stress acts on the first piezoelectric sheet 3a and the second piezoelectric sheet 3b, a potential difference resulting from the thermal stress detected in the entire piezoelectric sheet 3 by the detection electrode 4 is calculated as V1a−V2b=0 from expression 8' and is not detected at all. As a result, a malfunction caused by a thermal stress does not occur in the pressure detector 100 according to the present invention.

In particular, if the first piezoelectric sheet 3a and the second piezoelectric sheet 3b are composed of a ferroelectric, the first piezoelectric sheet 3a and the second piezoelectric sheet 3b are preferably configured such that the polarization directions thereof are opposite to each other in a press-free state. With this configuration, if a temperature change occurs in the pressure detector 100 and a pyroelectric effect occurs in the sheet 3, the same positive/negative charge is generated on the input surface side of the first piezoelectric sheet 3a and the rear surface side of the second piezoelectric sheet 3b (for example, if a positive charge is generated at the surface on the input surface side of the piezoelectric sheet 3, a positive charge is generated also at the surface on the rear surface side of the piezoelectric sheet 3, and, if a negative charge is generated at the surface on the input surface side of the piezoelectric sheet 3, a negative charge is generated also at the surface on the rear surface side of the piezoelectric sheet 3). At this time, a potential difference ($V_{11}$) generated across the first piezoelectric sheet 3a and a potential difference ($V_{22}$) generated across the second piezoelectric sheet 3b are generated to satisfy the following relational expression 9.

$$V_{11}/V_{22}<0 \qquad \text{Expression 9:}$$

In expression 9, $V_{11}$ represents a potential at the surface on the input surface side of the first piezoelectric sheet 3a generated by a pyroelectric effect and is expressed by $V_{11a}-V_{11b}$. $V_{22}$ represents a potential at the surface on the rear surface side of the second piezoelectric sheet 3b generated by a pyroelectric effect and is expressed by $V_{22a}-V_{22b}$. $V_{11a}$ represents a potential at the surface on the input surface side of the first piezoelectric sheet 3a generated by a pyroelectric effect, and $V_{11b}$ represents a potential at the surface on the rear surface side of the first piezoelectric sheet 3a generated by a pyroelectric effect. $V_{22a}$ represents a potential at the surface on the input surface side of the second piezoelectric sheet 3b generated by a pyroelectric effect, and $V_{22b}$ represents a potential at the surface on the rear surface side of the second piezoelectric sheet 3b generated by a pyroelectric effect.

As described above, the first piezoelectric sheet 3a and the second piezoelectric sheet 3b 1) have a sufficiently small thickness (for example, 5 μm to 50 μm),
2) are close to each other (for example, close to each other with a distance of 1 μm to 50 μm therebetween) or in contact with each other, and
3) are composed of materials having identical characteristics.

Thus, if a pyroelectric effect resulting from a temperature change occurs in the first piezoelectric sheet 3a and the second piezoelectric sheet 3b, the potential difference ($V_{11}$) generated across the first piezoelectric sheet 3a and the potential difference ($V_{22}$) generated across the second piezoelectric sheet 3b satisfy the following relational expression 10.

$$|V_{11}|\approx|V_{22}| \qquad \text{Expression 10:}$$

Furthermore, with the above-described configuration, the following relational expression 11 is satisfied between the surface on the rear surface side of the first piezoelectric sheet 3a and the surface on the input surface side of the second piezoelectric sheet 3b.

$$V_{11b}\approx V_{22a} \qquad \text{Expression 11}$$

Thus, relational expression 12 is derived from relational expressions 9 to 11.

$$V_{11a}\approx V_{22b} \qquad \text{Expression 12:}$$

Thus, with the above-described configuration, if the piezoelectric sheet 3 is influenced by a pyroelectric effect, a potential at the surface on the input surface side of the first piezoelectric sheet 3a and a potential at the surface on the rear surface side of the second piezoelectric sheet 3b generated as a result of the pyroelectric effect are substantially equal to each other. Accordingly, if the first piezoelectric sheet 3a and the second piezoelectric sheet 3b are influenced by a pyroelectric effect in the pressure detector 100, a potential difference across the piezoelectric sheet 3 resulting from the pyroelectric effect and detected by the detection electrode 4 is calculated as $V_{11a}-V_{22b}\approx0$ from expression 12 and is substantially "0". Thus, even if a pyroelectric effect occurs in the first piezoelectric sheet 3a and the second piezoelectric sheet 3b, a potential difference derived from the pyroelectric effect is hardly detected in the entire piezoelectric sheet 3. That is, if the piezoelectric sheet 3 (the first piezoelectric sheet 3a and the second piezoelectric sheet 3b) is composed of a ferroelectric and if the piezoelectric sheet 3 and the detection electrode 4 have the above-described configuration, a malfunction due to a temperature change (a malfunction resulting from a pyroelectric effect in addition to a malfunction resulting from a thermal stress) hardly occurs in the pressure detector 100.

Description has been given that the first piezoelectric sheet 3a and the second piezoelectric sheet 3b 1) have a sufficiently small thickness, 2) are close to each other or in contact with each other, and 3) are composed of materials having identical characteristics. In addition, preferably, the first piezoelectric sheet 3a and the second piezoelectric sheet 3b 4) are in contact with each other, 5) are identical in terms of pressure distribution and temperature distribution, and 6) are composed of an identical material.

If the first piezoelectric sheet 3a and the second piezoelectric sheet 3b have the above-described configuration, the above expressions 10 to 12 are rewritten as follows.

$$|V11|=|V22| \qquad \text{Expression 10':}$$

$$V11b=V22a \qquad \text{Expression 11':}$$

Also, relational expression 12' is derived from relational expressions 9, 10', and 11'.

$$V11a=V22b \qquad \text{Expression 12':}$$

That is, with the above-described configuration, even if a pyroelectric effect acts on the first piezoelectric sheet 3a and the second piezoelectric sheet 3b, a potential difference resulting from the pyroelectric effect detected in the piezoelectric sheet 3 by the detection electrode 4 is calculated as V11a−V22b=0 from expression 12' and is not detected. As a result, a malfunction due to a temperature change (a malfunction resulting from a pyroelectric effect in addition to a malfunction resulting from a thermal stress) does not occur in the pressure detector 100 according to the present invention.

Figure 4:
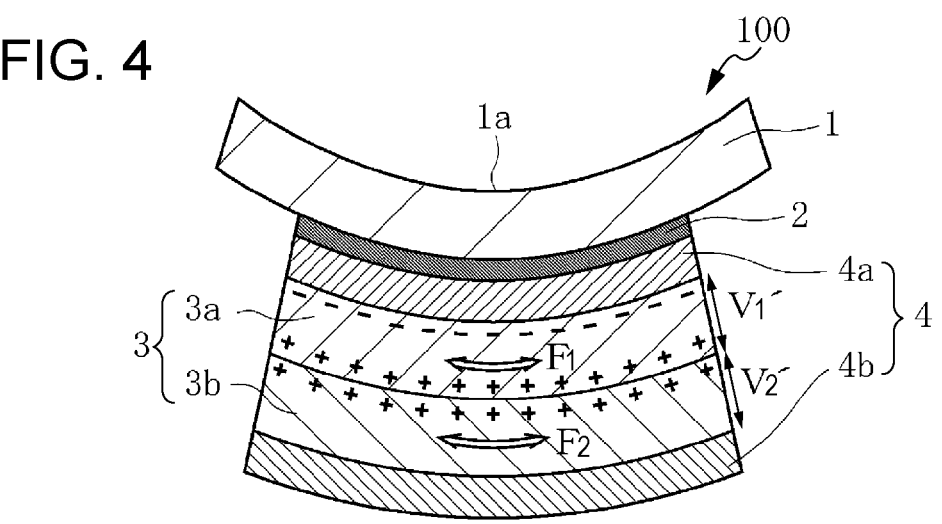
FIG. 4 is a cross-sectional view of the pressure detector.

Furthermore, with the above-described configuration, in a case where the adhesive layer 2 included in the pressure detector 100 is thick and soft or in a case where the hardness of the adhesive layer 2 is changed by a temperature change, as illustrated in FIG. 4, the pressure detector 100 exhibits high detection sensitivity even if shear deformation occurs in the adhesive layer 2. Hereinafter, a description will be given of the reason why the pressure detector 100 according to the present invention is able to maintain high detection sensitivity even if shear deformation occurs in the adhesive layer 2.

As illustrated in FIG. 4, when a press is applied to the pressure detector 100, a tensile stress occurs in the piezoelectric sheet 3 (the first piezoelectric sheet 3a and the second piezoelectric sheet 3b) because the support substrate 1 has greater rigidity than the piezoelectric sheet 3 and the detection electrode 4, as described above. At this time, a tensile stress $F_1$ occurs in the first piezoelectric sheet 3a and a tensile stress $F_2$ occurs in the second piezoelectric sheet 3b. As a result, charges corresponding to the tensile stresses are generated at the surfaces on the input surface side and the surfaces on the rear surface side of the first piezoelectric sheet 3a and the second piezoelectric sheet 3b. The generated charges cause potential differences to be generated between the surfaces on the input surface side and the surfaces on the rear surface side of the individual piezoelectric sheets 3. A potential difference $V_1'$ generated across the first piezoelectric sheet 3a is $V_{1a}'-V_{1b}'$, and the potential difference $V_1'$ is proportional to the intensity of the tensile stress $F_1$. A potential difference $V_2'$ generated across the second piezoelectric sheet 3b is $V_{2a}'-V_{2b}'$, and the potential difference $V_2'$ is also proportional to the intensity of the tensile stress $F_2$. That is, the relationships expressed by the following relational expressions 13 and 14 are established between the tensile stress $F_1$ and the potential difference $V_1'$ and between the tensile stress $F_2$ and the potential difference $V_2'$.

$$V_1' \propto F_1 \qquad \text{Expression 13:}$$

In expression 13, $V_1'$ represents a potential generated in the first piezoelectric sheet 3a in a case where a press is applied to the pressure detector 100 and is expressed by $V_{1a}'-V_{1b}'$. $V_{1a}'$ represents a potential at the surface on the input surface side of the first piezoelectric sheet 3a in a case where a press is applied to the pressure detector 100, and $V_{1b}'$ represents a potential at the surface on the rear surface side of the first piezoelectric sheet 3a in a case where a press is applied to the pressure detector 100.

$$V_2' \propto F_2 \qquad \text{Expression 14:}$$

In expression 14, $V_2'$ represents a potential generated in the second piezoelectric sheet 3b in a case where a press is applied to the pressure detector 100 and is expressed by $V_{2a}'-V_{2b}'$. $V_{2a}'$ represents a potential at the surface on the input surface side of the second piezoelectric sheet 3b in a case where a press is applied to the pressure detector 100, and $V_{2b}'$ represents a potential at the surface on the rear surface side of the second piezoelectric sheet 3b in a case where a press is applied to the pressure detector 100.

Furthermore, since the surface on the rear surface side of the first piezoelectric sheet 3a and the surface on the input surface side of the second piezoelectric sheet 3b are in contact with each other or close to each other (for example, close to each other with a distance of 1 μm to 50 μm therebetween), the following relational expression 15 is satisfied.

$$V_{1b}' \approx V_{2a}' \qquad \text{Expression 15:}$$

Expression 15 can be approximated to expression 16.

$$V_{1b}' = V_{2a}' \qquad \text{Expression 16:}$$

Thus, relational expression 17 is derived from relational expressions 13, 14, and 16.

$$V_{2b}'-V_{1a}' \propto F_2-F_1 \qquad \text{Expression 17:}$$

In expression 17, $V_{2b}'-V_{1a}'$ represents a potential difference between the surface on the input surface side of the first piezoelectric sheet 3a and the surface on the rear surface side of the second piezoelectric sheet 3b in a case where a press is applied to the pressure detector 100, and $F_2-F_1$ represents a difference between tensile stresses applied to the first piezoelectric sheet 3a and the second piezoelectric sheet 3b in a case where a press is applied to the pressure detector 100.

Here, $V_{2b}'-V_{1a}'$ represents a potential difference between the surface on the input surface side of the first piezoelectric sheet 3a and the surface on the rear surface side of the second piezoelectric sheet 3b in a case where a press is applied to the pressure detector 100, as described above. Since the detection electrode 4 is located on the surface on the input surface side of the first piezoelectric sheet 3a and the surface on the rear surface side of the second piezoelectric sheet 3b, $V_{2b}'-V_{1a}'$ is equal to a potential difference V' detected by the detection electrode 4. Also, since the support substrate 1 has sufficient rigidity compared to the piezoelectric sheet 3 and the detection electrode 4, $F_2-F_1$ is proportional to a curvature (1/r) of the pressure detector 100 in a case where the pressure detector 100 bends. Thus, expression 17 can be converted to expression 18.

$$V' \propto 1/r \qquad \text{Expression 18:}$$

V represents a potential difference output from the detection electrode 4 when a press is applied to the pressure detector 100, and 1/r represents a curvature of the pressure detector 100 in a case where a press is applied to the pressure detector 100.

From expression 18, if the pressure detector 100 has the above-described configuration, the potential difference V' detected by the detection electrode 4 is proportional to the curvature (1/r) of the pressure detector 100 in a case where the pressure detector 100 bends, and does not depend on the thickness and softness of the adhesive layer 2 (shear deformation that occurs in the adhesive layer 2).

The pressure detector 100 is configured such that the support substrate 1 is composed of a material having greater flexural rigidity than the piezoelectric sheet 3 and the detection electrode 4, the piezoelectric sheet 3 is formed of the first piezoelectric sheet 3a and the second piezoelectric sheet 3b, the surface on the rear surface side of the first piezoelectric sheet 3a and the surface on the input surface side of the second piezoelectric sheet 3b are in contact with each other or close to each other (for example, close to each other with a distance of 1 µm to 50 µm therebetween), and the piezoelectric sheet 3 is sandwiched by the detection electrode 4. Accordingly, the pressure detector 100 is able to maintain high detection sensitivity even if shear deformation occurs in the adhesive layer 2.

Figure 5:
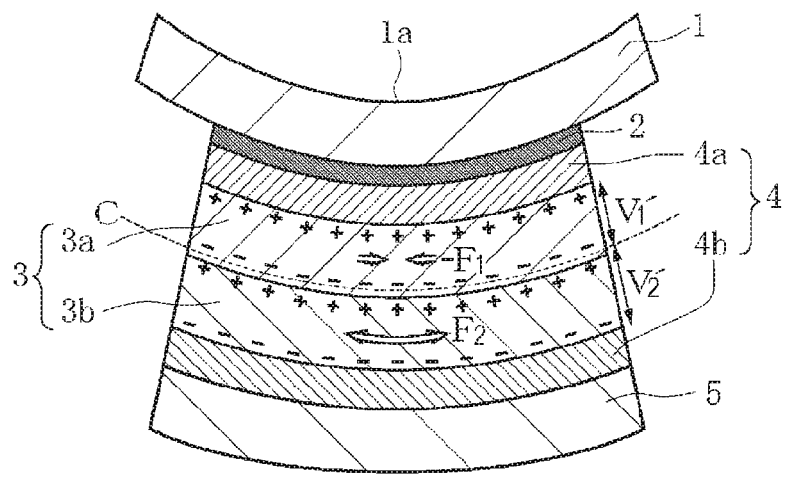
FIG. 5 is a cross-sectional view of the pressure detector.

As illustrated in FIG. 5, if the display device 5 is located on the rear surface side of the second piezoelectric sheet 3b, a neutral axis C of the pressure detector 100 may exist near the center of the piezoelectric sheet 3. In such a case, a press applied to the pressure detector 100 causes a compressive stress ($-F_1$) to be generated in the first piezoelectric sheet 3a and a tensile stress ($F_2$) to be generated in the second piezoelectric sheet 3b. Accordingly, the stress is cancelled as a whole, and it seems that it is impossible to detect the amount of press applied to the pressure detector 100. However, since the pressure detector 100 has the above-described configuration, the potential difference V' detected by the detection electrode 4 depends on the curvature (1/r) of the pressure detector 100 and does not depend on the display device 5, on the basis of expression 18. Thus, even if the display device 5 is located on the rear surface side of the second piezoelectric sheet 3b, the pressure detector 100 is able to detect the amount of press applied thereto with high sensitivity.

The first piezoelectric sheet 3a and the second piezoelectric sheet 3b forming the piezoelectric sheet 3 may be sheets obtained by forming a ferroelectric material or a material composed of a D-isomer or L-isomer of a chiral polymer exhibiting piezoelectricity (an optical isomeric material exhibiting piezoelectricity) into sheets and then drawing the sheets (drawn sheets). Examples of the ferroelectric material include PVDF and PZT. Examples of the optical isomeric material exhibiting piezoelectricity include polylactic acid and polyamino acid.

Although a combination of materials used for the first piezoelectric sheet 3a and the second piezoelectric sheet 3b is not particularly limited, it is preferable that the first piezoelectric sheet 3a and the second piezoelectric sheet 3b be composed of materials having identical characteristics. For example, if a ferroelectric material is used for the first piezoelectric sheet 3a, it is preferable that a ferroelectric material be used also for the second piezoelectric sheet 3b. If an optical isomeric material exhibiting piezoelectricity is used for the first piezoelectric sheet 3a, it is preferable that an optical isomeric material exhibiting piezoelectricity be used also for the second piezoelectric sheet 3b.

If an optical isomeric material is used for the first piezoelectric sheet 3a and the second piezoelectric sheet 3b, it is preferable that a D-isomer of a chiral polymer exhibiting piezoelectricity be used for the first piezoelectric sheet 3a and an L-isomer of a chiral polymer exhibiting piezoelectricity be used for the second piezoelectric sheet 3b (or that an L-isomer of the polymer be used for the first piezoelectric sheet 3a and a D-isomer of the polymer be used for the second piezoelectric sheet 3b). With this configuration, if the display device 5 is located on the rear surface side of the pressure detector 100, the first piezoelectric sheet 3a and the second piezoelectric sheet 3b also function as phase-difference films, and thereby the necessity of using separate phase-difference films is eliminated.

More preferably, the first piezoelectric sheet 3a and the second piezoelectric sheet 3b are composed of an identical material (the materials identical in terms of pyroelectric constant, piezoelectric constant, and sheet thickness). With this configuration, an output from the piezoelectric sheet generated from a thermal stress and pyroelectric effect caused by a temperature change can be completely cancelled.

A method for stacking the first piezoelectric sheet 3a and the second piezoelectric sheet 3b is not particularly limited as long as they are stacked so as to satisfy the relationship of expression 1. If a ferroelectric material is used for the piezoelectric sheet 3, it is preferable that the first piezoelectric sheet 3a and the second piezoelectric sheet 3b be stacked such that the front and rear surfaces of the first piezoelectric sheet 3a and the second piezoelectric sheet 3b are reversed with respect to each other. If drawn sheets are used for the piezoelectric sheet 3, it is preferable that the drawn sheets be stacked such that the front and rear surfaces of the drawn sheets are reversed with respect to each other and the drawn directions are parallel to each other or such that the front and rear surfaces of the drawn sheets match each other and the drawn directions are orthogonal to each other.

4) Detection Electrode

The detection electrode 4 is formed of the first detection electrode 4a and the second detection electrode 4b. The first detection electrode 4a is located between the support substrate 1 and the first piezoelectric sheet 3a, and the second detection electrode 4b is located on the rear surface side of the first piezoelectric sheet 3a. The first detection electrode 4a and the second detection electrode 4b are composed of a conductive material. As a conductive material, a transparent conductive oxide such as indium tin oxide (Indium-Tin-Oxide, ITO) or tin zinc oxide (Tin-Zinc-Oxide, TZO), a conductive polymer such as polyethylenedioxythiophene (PolyEthyleneDiOxyThiophene, PEDOT), or the like may be used. In this case, the above-described electrode may be formed directly on the surface of the support substrate 1 or the piezoelectric sheet 3 by using vapor deposition or screen printing, or the electrode formed on a front surface of a resin film or the like by using vapor deposition or screen printing may be fixed to the support substrate 1 or the piezoelectric sheet 3 by using an adhesive. The detection electrode 4 may have a thickness of, for example, 1 nm to 30,000 nm.

Alternatively, a conductive metal such as copper or silver may be used as a conductive material. In this case, the above-described electrode may be formed on the piezoelectric sheet 3 through vapor deposition or may be formed by using a metallic paste such as a copper paste or silver paste. Alternatively, the electrode formed on a front surface of a resin film or the like by using vapor deposition or screen printing may be fixed to the support substrate 1 or the piezoelectric sheet 3 by using an adhesive.

Furthermore, a conductive material such as carbon nanotubes, metallic particles, or metallic nanofibers dispersed in a binder may be used as a conductive material.

5) Detector

The detector is a device that detects the amount of press from a voltage signal detected by the detection electrode. The detector is formed of a charge amplifier using an operation amplifier.

6) Pressing Means

Pressing means for applying a press to the pressure detector 100 is not particularly limited as long as it is capable of applying a press. For example, a finger or a stylus pen may be used as the pressing means.

3. Touch Panel

1) Overall Structure of Touch Panel (1) First Embodiment

Next, a first embodiment of a touch panel according to the present invention will be described. A basic structure of a pressure detector included in the touch panel is as described above. Thus, only different points will mainly be described about the pressure detector. In the following description, a side on which an input surface (an operation surface 60*a* described below) of the touch panel is positioned is referred to as an "input surface side". The "input surface side" is a side that faces a user who operates the touch panel 50. In contrast, a back side viewed from the user who operates the touch panel 50 is referred to as a "rear surface side".

Figure 6:
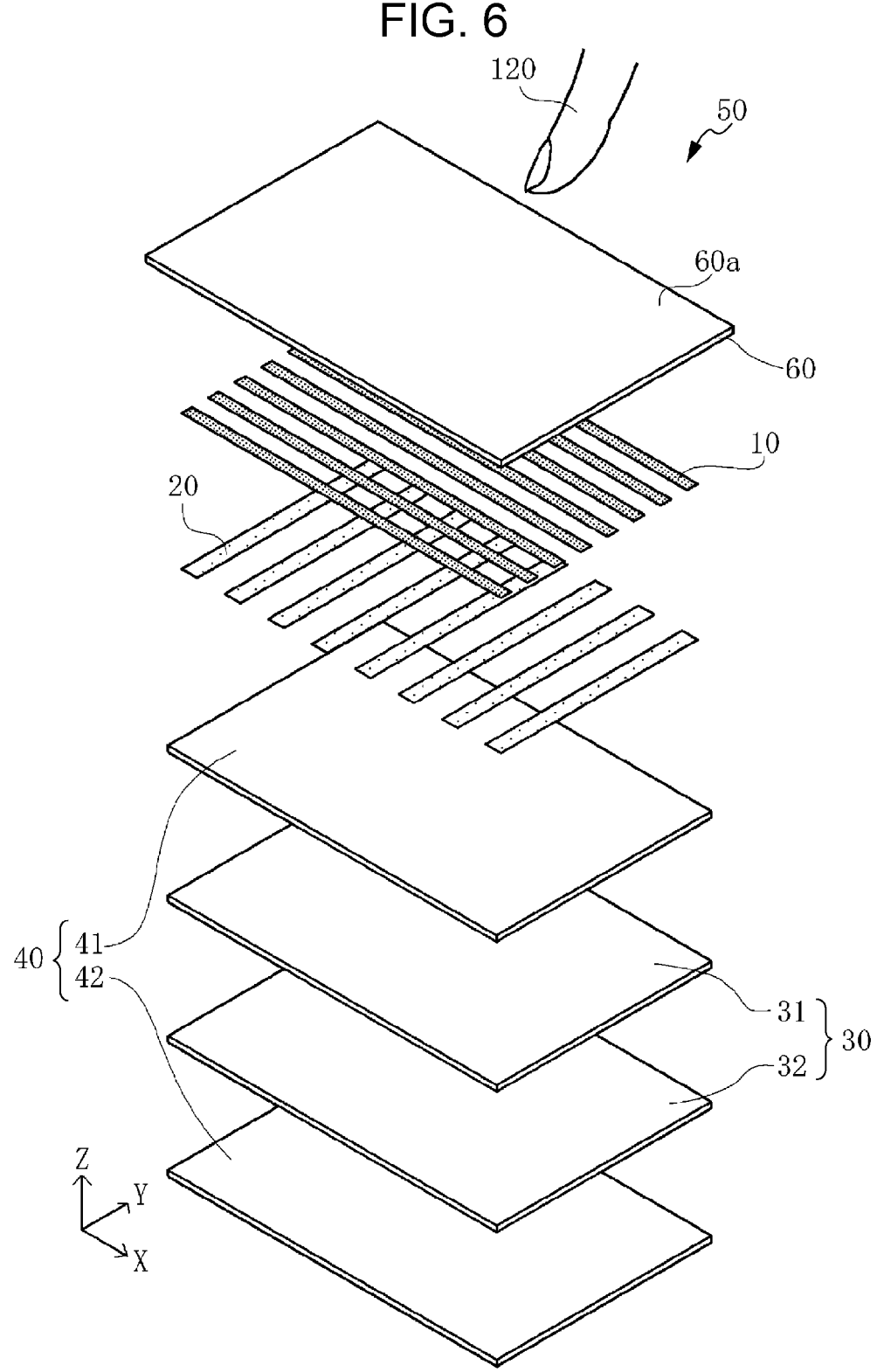
FIG. 6 is a perspective view of a touch panel.

As illustrated in FIG. 6, the touch panel 50 includes upper electrodes 10, lower electrodes 20, a piezoelectric sheet 30, and a detection electrode 40. The touch panel 50 according to this embodiment further includes a protective plate 60. The protective plate 60, the upper electrodes 10, the lower electrodes 20, the piezoelectric sheet 30, and the detection electrode 40 are stacked in the described order from the input surface side toward the rear surface side.

1) Protective Plate

The protective plate 60 is located on the most input surface side in the touch panel 50, specifically, is adhered on the input surface side of the upper electrodes 10. Preferably, the protective plate 60 is transparent, scratch resistant, and stain resistant. Such a protective plate 60 may be formed by using, for example, glass. Furthermore, the protective plate 60 includes the operation surface 60*a* on its front surface on the input surface side. The operation surface 60*a* is a surface that is to be touched (operated) by a finger or the like of a user when the user inputs a certain operation to the touch panel 50.

2) Upper Electrodes

As illustrated in FIG. 6, the plurality of upper electrodes 10 are formed on the surface on the rear surface side of the protective plate 60 in this embodiment. The plurality of upper electrodes 10 are located parallel to one another so as to be arranged at certain intervals in a Y-axis direction. In this embodiment, the upper electrodes 10 are formed in a striped pattern (linearly with a constant width). Alternatively, the upper electrodes 10 may be formed in, for example, a wave pattern or zigzag pattern. In any case, the individual upper electrodes 10 are formed to extend along an X-axis direction as a whole.

Preferably, the upper electrodes 10 are composed of a material with excellent transparency. Examples of a material satisfying such a requirement include metal oxides such as tin oxide, indium oxide, antimony oxide, zinc oxide, cadmium oxide, and indium tin oxide (ITO); silver nanowires; carbon nanotubes; and conductive polymers. The upper electrodes 10 are formed of a transparent conductive film composed of these materials and may have a thickness of, for example, 5 nm to 5000 nm. In this embodiment, the upper electrodes 10 are formed of an ITO thin film. In this case, the upper electrodes 10 may be formed directly on the surface of the protective plate 60 by using vapor deposition, screen printing, or the like, or the upper electrodes 10 formed on a front surface of a resin film or the like by using vapor deposition, screen printing, or the like may be fixed to the protective plate 60 by using an adhesive. The upper electrodes 10 may have a thickness of, for example, 1 nm to 20 μm.

3) Lower Electrodes

The plurality of lower electrodes 20 are formed on the rear surface side of the upper electrodes 10 in this embodiment. The plurality of lower electrodes 20 are located parallel to one another so as to be arranged at certain intervals in the X-axis direction. In this embodiment, the lower electrodes 20 are formed in a striped pattern (linearly with a constant width). Alternatively, the lower electrodes 20 may be formed in, for example, a wave pattern or zigzag pattern. In any case, the individual lower electrodes 20 are formed to extend along the Y-axis direction as a whole. Accordingly, the upper electrodes 10 and the lower electrodes 20 are located to cross each other (orthogonal to each other in this example) in a plan view. Preferably, the lower electrodes 20 are composed of a material with excellent transparency, like the upper electrodes 10. The material for the lower electrodes 20 and the thickness of the lower electrodes 20 may be similar to those of the upper electrodes 10. Also, a method for forming the lower electrodes 20 may be similar to that of the upper electrodes 10.

The plurality of upper electrodes 10 are connected to a detection circuit (not illustrated) via respective routing wires. Also, the plurality of lower electrodes 20 are connected to the detection circuit via respective routing wires. The routing wires are formed by using a conductive paste of metal such as gold, silver, copper, and nickel, or carbon or the like.

4) Piezoelectric Sheet

As illustrated in FIG. 6, the piezoelectric sheet 30 is formed of at least a plurality of piezoelectric sheets. In this embodiment, the piezoelectric sheet 30 is formed of a first piezoelectric sheet 31 and a second piezoelectric sheet 32. In this embodiment, the first piezoelectric sheet 31 is located on the protective plate 60 side, and the second piezoelectric sheet 32 is located on the rear surface side.

5) Detection Electrode

As illustrated in FIG. 6, the detection electrode 40 is formed of a first detection electrode 41 and a second detection electrode 42. The first detection electrode 41 and the second detection electrode 42 sandwich the piezoelectric sheet 30.

The first detection electrode 41 is planar or is formed of a plurality of strips arranged at intervals, and is located between the first piezoelectric sheet 31 and the lower electrodes 20. In this embodiment, the first detection electrode 41 is planar and is located in the foregoing space. The first detection electrode 41 is electrically connected to the first piezoelectric sheet 31 and a detection unit described below, and is able to detect a potential generated from the front surface on the protective plate 60 side of the first piezoelectric sheet 31 when a press is applied to the touch panel 50 by pressing means 120 and the first piezoelectric sheet 31 bends and to transmit the detected potential to the detection unit.

The second detection electrode 42 is planar or is formed of a plurality of strips arranged at intervals, and is located on the surface opposite to the protective plate 60 of the second piezoelectric sheet 32 (in the case of strips, they are arranged so as to overlap the first detection electrode 41). In this embodiment, the second detection electrode 42 is planar and is located in the foregoing space. The second detection electrode 42 is electrically connected to the second piezoelectric sheet 32 and the detection unit described below, and is able to detect a charge generated from the front surface opposite to the protective plate 60 of the second piezoelectric sheet 32 when a press is applied to the touch panel 50 by the pressing means 120 and the second piezoelectric sheet 32 bends and to transmit the detected charge to the detection unit.

5) Control Unit

The touch panel 50 includes a control unit (not illustrated) including an arithmetic processing device such as a CPU, and the control unit is configured to perform a position detection operation and a pressing force detection operation. Specifically, when the touch panel 50 (the operation surface 60a) is touched by a user's finger or the like, a capacitance (self-capacitance) between the upper electrodes 10 and the user's finger or the like and a capacitance (self-capacitance) between the lower electrodes 20 and the user's finger or the like change. Alternatively, a capacitance (mutual capacitance) between the upper electrodes 10 and the lower electrodes 20 changes. Furthermore, a resistance value between the upper electrodes 10 and the lower electrodes 20 changes. The control unit detects the change in these capacitances and the change in resistance and is thereby able to determine a press position in an X-Y coordinate system on the operation surface 60a. When the touch panel 50 (the operation surface 60a) is touched by the user's finger or the like, a potential difference across the piezoelectric sheet 30 changes in accordance with the intensity of the applied pressing force, as described above. The control unit detects the change in potential difference across the piezoelectric sheet 30 and is thereby able to determine the intensity of the pressing force applied in a direction (Z direction) orthogonal to the operation surface 60a.

(2) Second Embodiment

Next, a second embodiment of the touch panel according to the present invention will be described. A basic structure of the touch panel is the same as in the first embodiment, and thus only different points will be described below.

Figure 7:
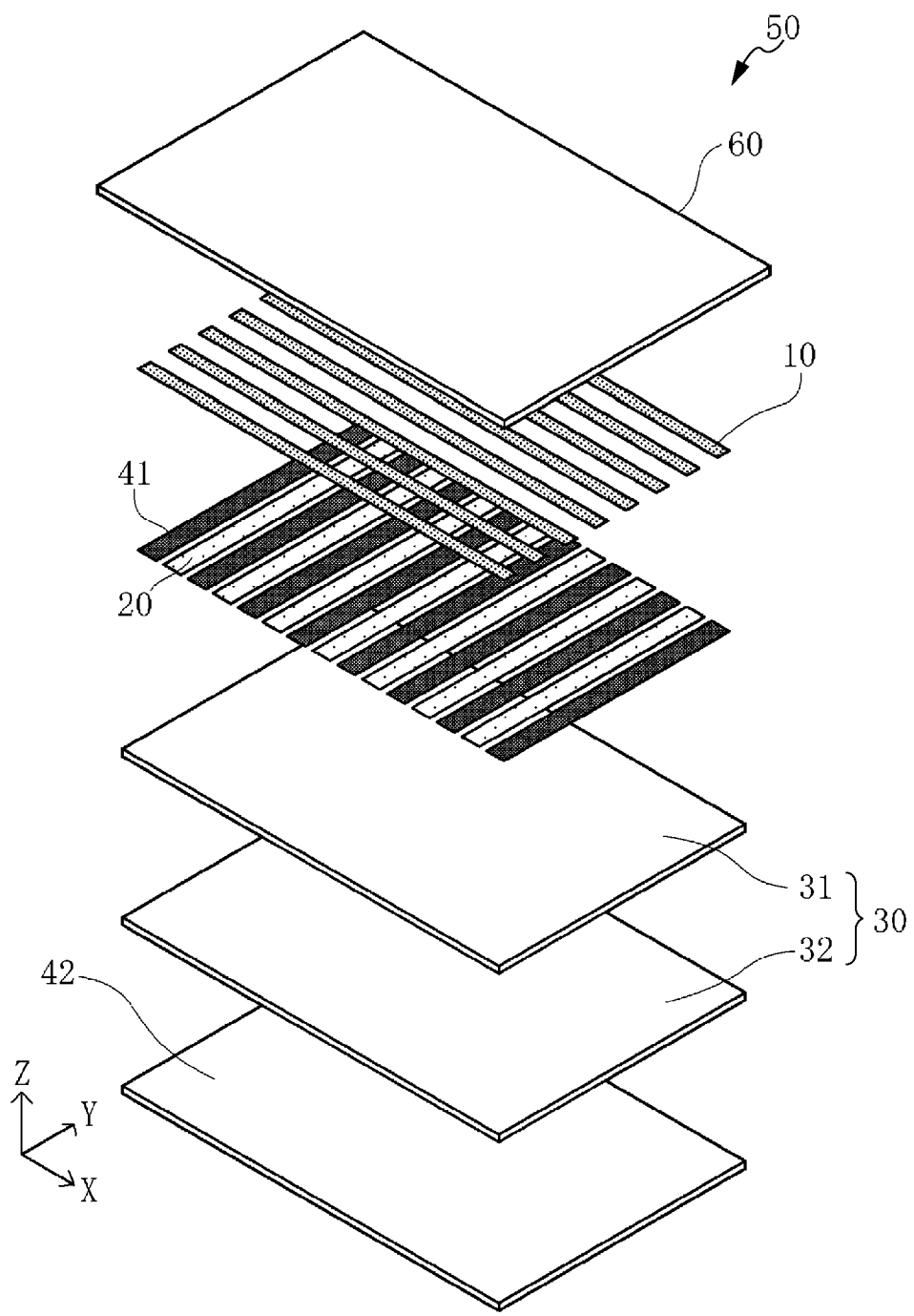
FIG. 7 is a perspective view of a touch panel.

As illustrated in FIG. 7, the touch panel 50 according to the second embodiment includes the upper electrodes 10, the lower electrodes 20, and the first detection electrodes 41, which are located on the input surface side (the protective plate 60 side) of the piezoelectric sheet 30. The second detection electrode 42 is located on the rear surface side of the piezoelectric sheet 30.

In this embodiment, the lower electrodes 20 are located parallel to one another so as to be arranged at certain intervals in the X-axis direction. The first detection electrodes 41 are located at the certain intervals with gaps interposed between the first detection electrodes 41 and the lower electrodes 20. In this embodiment, the lower electrodes 20 and the first detection electrodes 41 are formed in a striped pattern (linearly with a constant width), but the lower electrodes 20 and the first detection electrodes 41 may be formed in, for example, a wave pattern or zigzag pattern. In any case, the individual lower electrodes 20 and the individual first detection electrodes 41 are formed to extend along the Y-axis direction as a whole.

According to the above-described configuration, the first detection electrodes 41 are not stacked on the rear surface side of the lower electrodes 20 but are located in the same space (in the same plane) as the lower electrodes 20. Thus, the touch panel is thinner than the touch panel according to the first embodiment by the thickness of the first detection electrodes 41. In the above-described configuration, the lower electrodes 20 may also function as the first detection electrodes 41. If the lower electrodes 20 also function as the first detection electrodes 41, the detection method for the detection unit may be appropriately changed.

(3) Third Embodiment

Next, a third embodiment of the touch panel according to the present invention will be described. A basic structure of the touch panel is the same as in the first embodiment, and thus only different points will be described below.

Figure 8:
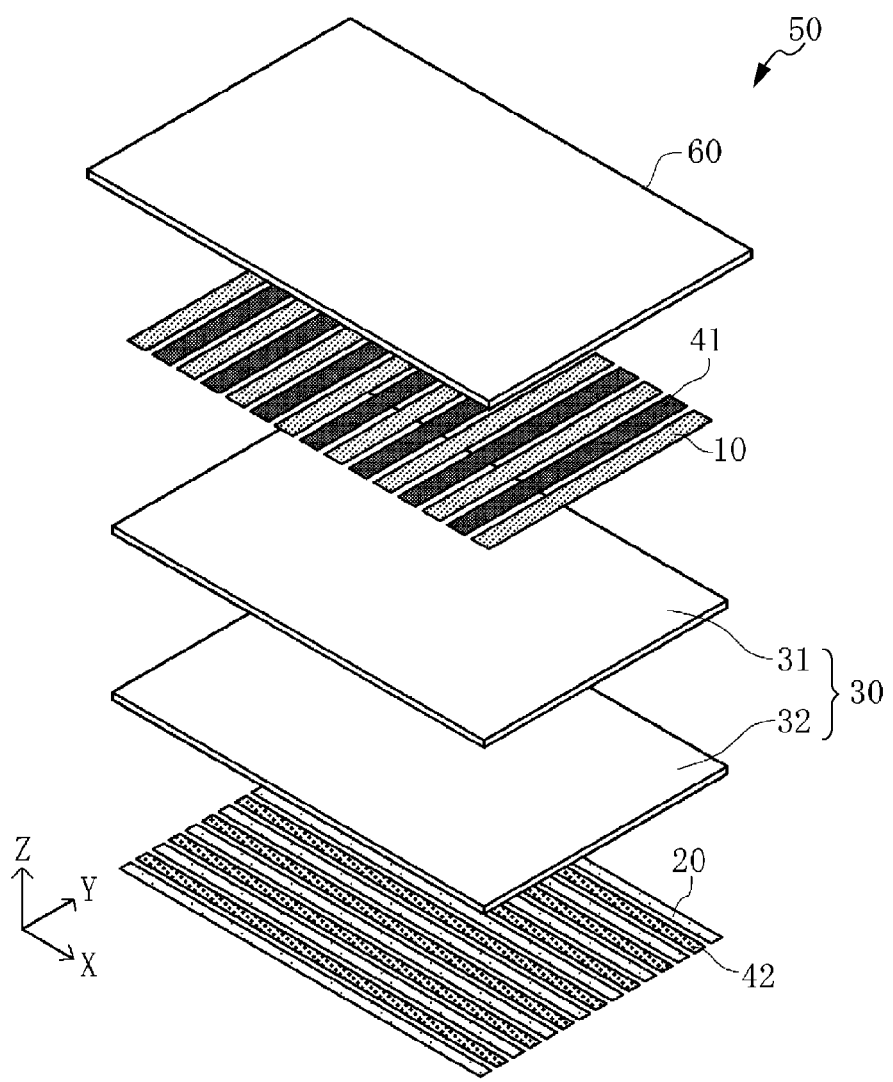
FIG. 8 is a perspective view of a touch panel.

As illustrated in FIG. 8, the touch panel 50 according to the third embodiment includes the upper electrodes 10 and the first detection electrodes 41 that are located on the input surface side (the protective plate 60 side) of the piezoelectric sheet 30, and the lower electrodes 20 and the second detection electrodes 42 that are located on the rear surface side of the piezoelectric sheet 30.

In this embodiment, the upper electrodes 10 are located parallel to one another so as to be arranged at certain intervals in the X-axis direction. The first detection electrodes 41 are located at the certain intervals with gaps interposed between the first detection electrodes 41 and the upper electrodes 10. In this embodiment, the upper electrodes 10 and the first detection electrodes 41 are formed in a striped pattern (linearly with a constant width), but the upper electrodes 10 and the first detection electrodes 41 may be formed in, for example, a wave pattern or zigzag pattern. In any case, the individual upper electrodes 10 and the individual first detection electrodes 41 are formed to extend along the Y-axis direction as a whole.

The lower electrodes 20 are located parallel to one another so as to be arranged at certain intervals in the Y-axis direction. The second detection electrodes 42 are located at the certain intervals with gaps interposed between the second detection electrodes 42 and the lower electrodes 20. In this embodiment, the lower electrodes 20 and the second detection electrodes 42 are formed in a striped pattern (linearly with a constant width), but the lower electrodes 20 and the second detection electrodes 42 may be formed in, for example, a wave pattern or zigzag pattern. In any case, the individual lower electrodes 20 and the individual second detection electrodes 42 are formed to extend along the X-axis direction as a whole.

According to the above-described configuration, the first detection electrodes 41 are not stacked between the lower electrodes 20 and the piezoelectric sheet 30 but are located in the same space (in the same plane) as the upper electrodes 10. Furthermore, the second detection electrodes 42 are not stacked on the rear surface side of the lower electrodes 20 but are located in the same space (in the same plane) as the lower electrodes 20. Thus, the touch panel is thinner than the touch panel according to the first embodiment by the thickness of the first detection electrodes 41 and the second detection electrodes 42. In the above-described configuration, the upper electrodes 10 may also function as the first detection electrodes 41, and the lower electrodes 20 may also function as the second detection electrodes 42. If the upper electrodes 10 also function as the first detection electrodes 41 or if the lower electrodes 20 also function as the second detection electrodes 42, the detection method for the detection unit may be appropriately changed.

REFERENCE SIGNS LIST

1: support substrate
1a: input surface
2: adhesive layer
3: piezoelectric sheet
3a: first piezoelectric sheet
3b: second piezoelectric sheet
4: detection electrode
4a: first detection electrode
4b: second detection electrode
5: display device
6: casing
6a: recessed portion
6b: support portion
7: space portion
10: upper electrode
20: lower electrode
30: piezoelectric sheet
31: first piezoelectric sheet
32: second piezoelectric sheet
40: detection electrode
41: first detection electrode
42: second detection electrode
50: touch panel
60: protective plate
100: pressure detector
110: electronic device
120: pressing means

The invention claimed is:

1. A touch panel that measures a pressing force of a press applied to an input surface, comprising:
a plurality of upper electrodes located at intervals in one direction;
a plurality of lower electrodes that are located at intervals in a direction crossing the upper electrodes, on a side opposite to an input surface side of the upper electrodes, and that detect a press position between the upper electrodes and the lower electrodes;
a piezoelectric sheet including a first piezoelectric sheet located on a surface opposite to the input surface side of the lower electrodes and a second piezoelectric sheet located on a surface opposite to the input surface side of the first piezoelectric sheet so as to be close to or in contact with the first piezoelectric sheet;
first detection electrodes located in spaces between the lower electrodes in a cross-sectional view of the touch panel; and
a second detection electrode that is located on a surface opposite to the input surface side of the second piezoelectric sheet and that detects a potential difference generated in the piezoelectric sheet in cooperation with the first detection electrodes when the press is applied, wherein
the first piezoelectric sheet and the second piezoelectric sheet are composed of materials having identical characteristics and have a thickness of 5 μm to 50 μm,
potential differences respectively generated between surfaces on the input surface side and surfaces opposite to the input surface of the first piezoelectric sheet and the second piezoelectric sheet when the first piezoelectric sheet and the second piezoelectric sheet are pulled in an in-plane direction have a relationship expressed by expression 3: $V_1/V_2<0$, and
in expression 3,
$V_1$ represents $V_{1a}-V_{1b}$,
$V_2$ represents $V_{2a}-V_{2b}$,
$V_{1a}$ represents a potential at the surface on the input surface side of the first piezoelectric sheet,
$V_{1b}$ represents a potential at the surface opposite to the input surface side of the first piezoelectric sheet,
$V_{2a}$ represents a potential at the surface on the input surface side of the second piezoelectric sheet, and
$V_{2b}$ represents a potential at the surface opposite to the input surface side of the second piezoelectric sheet.

2. The touch panel according to claim 1, wherein the lower electrodes also function as the first detection electrodes.

3. A touch panel that measures a pressing force of a press applied to an input surface, comprising:
a plurality of upper electrodes located at intervals in one direction;
a plurality of lower electrodes that are located at intervals in a direction crossing the upper electrodes, on a side opposite to an input surface side of the upper electrodes, and that detect a press position between the upper electrodes and the lower electrodes;
a piezoelectric sheet including a first piezoelectric sheet located on a surface opposite to the input surface side of the upper electrodes and a second piezoelectric sheet located on a surface opposite to the input surface side of the first piezoelectric sheet so as to be close to or in contact with the first piezoelectric sheet, the first piezoelectric sheet and the second piezoelectric sheet being located between the upper electrodes and the lower electrodes;
first detection electrodes located in spaces between the upper electrodes in a cross-sectional view of the touch panel; and
second detection electrodes that are located in spaces between the lower electrodes in a cross-sectional view of the touch panel and that detect a potential difference generated in the piezoelectric sheet in cooperation with the first detection electrodes when the press is applied, wherein
the first piezoelectric sheet and the second piezoelectric sheet are composed of materials having identical characteristics and have a thickness of 5 μm to 50 μm,
potential differences respectively generated between surfaces on the input surface side and surfaces opposite to the input surface of the first piezoelectric sheet and the second piezoelectric sheet when the first piezoelectric sheet and the second piezoelectric sheet are pulled in an in-plane direction have a relationship expressed by expression 4: $V_1/V_2<0$, and
in expression 4,
$V_1$ represents $V_{1a}-V_{1b}$,
$V_2$ represents $V_{2a}-V_{2b}$,
$V_{1a}$ represents a potential at the surface on the input surface side of the first piezoelectric sheet,
$V_{1b}$ represents a potential at the surface opposite to the input surface side of the first piezoelectric sheet,
$V_{2a}$ represents a potential at the surface on the input surface side of the second piezoelectric sheet, and
$V_{2b}$ represents a potential at the surface opposite to the input surface side of the second piezoelectric sheet.

4. The touch panel according to claim 3, wherein the upper electrodes also function as the first detection electrodes.

5. The touch panel according to claim 3, wherein the lower electrodes also function as the second detection electrodes.

* * * * *